May 3, 1966     A. V. WEASLER     3,249,377
SHAFT COUPLING WITH DENSE SPLINE ENDS
Filed Dec. 6, 1963

INVENTOR.
ANTHONY V. WEASLER
BY
Wheeler, Wheeler & Wheeler
ATTORNEYS

United States Patent Office 3,249,377
Patented May 3, 1966

3,249,377
SHAFT COUPLING WITH DENSE SPLINE ENDS
Anthony V. Weasler, 603 Ridge Road, West Bend, Wis.
Filed Dec. 6, 1963, Ser. No. 328,745
2 Claims. (Cl. 287—103)

This invention relates to a shaft coupling and a method of manufacture thereof.

Many tractors and trucks are provided with power take-off shafts having terminal splined male coupling elements. Many implements with which such tractors and trucks are used have flexibly jointed and extensible driven shafts with female coupling elements applicable to the power take-off shaft of the tractor or truck. Inasmuch as neither the power take-off shaft nor the driven shaft can ordinarily be rotated by hand, it becomes a very difficult matter to register the splines of the respective coupling elements. If a tool is used to rotate the driven shaft, it is desirable that the operator know which direction of rotation will require the least movement to the point of registry.

For this purpose, the present invention contemplates that the female coupling element at the end of the driven shaft have the ends of its splines beveled or tapered, preferably by a swedging operation. Since neither shaft is freely rotatable, this does not guide the splines into registry in any ordinary sense but it does make it possible for the operator manipulating the coupling elements to feel, in most instances, a slight angular thrust in one direction or the other toward the point of registry. If he then uses his wrench or bar to rotate the driven shaft in the direction indicated by this thrust, he will achieve registry with minimum displacement of the driven shaft.

In the preferred practice of the invention, the coupling elements are splined in the usual manner. Conventionally, such splines have clearance of only a few thousandths of an inch. A tool is then employed in the preferred practice of the invention to taper the ends of the splines in the driven coupling element by cutting or swedging. In the latter case, the metal is actually compacted to provide the tapered guiding surfaces contemplated by the invention. Since this may result in some deformation of the splines, it is preferred that following the swedging operation a broach be passed through the splined coupling element to eliminate any irregularities in the splines thereof.

Figure 1:
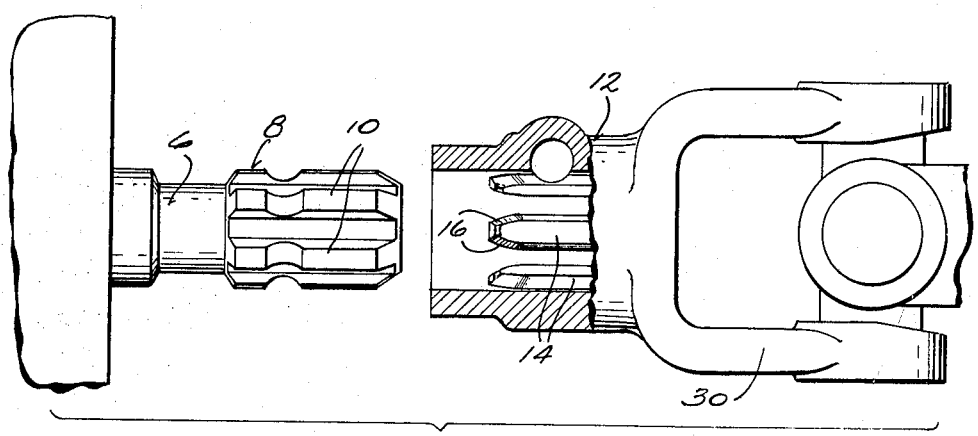
FIG. 1 is a view in plan fragmentarily illustrating a portion of a tractor or other powered vehicle from which a male power take-off coupling element projects, a portion of a universally jointed driven shaft being fragmentarily illustrated, with portions of the female coupling element broken away.

The conventional power take-off shaft 6 has a male coupling element 8 at its end, such element being provided with splines 10.

The female coupling element 12 of the universally jointed and extensible driven shaft is interiorly provided with splines 14 which, throughout the major portion of their length, are complementary to, and mate accurately with, the splines 10 of the driving coupling element of the power take-off shaft. However, in accordance with the present invention, each spline 14 has side surfaces which are taperingly convergent at 16 toward that end of the respective spline which is intended to be entered between two adjacent splines 10 in the assembly of the coupling elements.

Figures 2, 3:
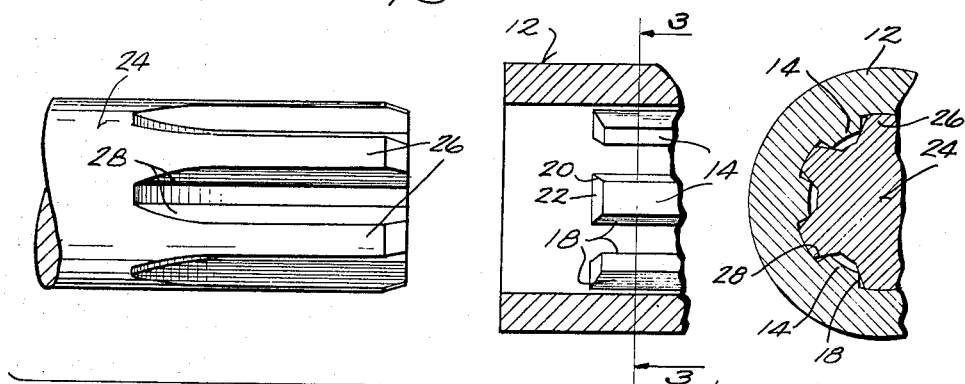
FIG. 2 is a view partially in plan and partially in section showing in mutually separated positions a swedging tool and the previously formed splines of the female coupling element, upon which said tool is about to act.
FIG. 3 is a view in section on line 3—3 of FIG. 2 showing the swedging tool in place in the female coupling element.
Figures 4, 5:
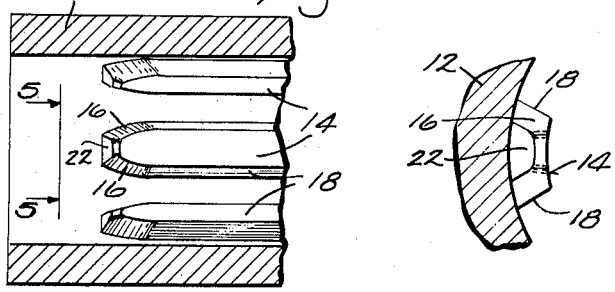
FIG. 4 is an enlarged fragmentary detail view fragmentarily showing a portion of the female coupling element after the splines thereof have been swedged.
FIG. 5 is a detail view taken in section on the line 5—5 of FIG. 4, is a swedged spline being shown in end elevation.

As best shown in FIG. 2, the splines 14, as originally formed, may be squarecut throughout their length, the radial side surfaces 18 forming a sharp angle at 20 with the oblique end surfaces 22 of the respective splines. However, in accordance with this invention, a taper 16 is provided. This may be done in any manner, as by a swedging tool, which may be of the type indicated at 24 in FIG. 2, such tool having guide teeth at 26 which enter as wedges between the splines 14 of the female coupling element. Such teeth progressively increase in width as shown at 28 in FIG. 2. If such a swedge is used, when the hardened tool is driven into the female coupling element, the metal of the splines 14 is deformed and compacted at the ends of the splines to produce on each spline the convergent tapering surfaces 16. These are best illustrated in FIGS. 4 and 5.

The result is to increase the clearance between the splines of the female coupling element and the splines of the male coupling element by perhaps to sixty fold or more at the extreme ends of splines 14. While the splines may still meet headon in some circumstances, there is a greatly increased likelihood that when the operator extends the driven shaft to engage the female coupling element with the male coupling element of the power take-off shaft, the tapered ends of the splines 14 may enter between the splines 10 to a limited extent sufficient so that the operator can feel a camming thrust in one direction of rotation or the other. If he then applies a wrench or other tool to rotate the driven shaft, a minimum rotation of such shaft will be required to achieve full mesh of the respective sets of splines. It is common practice to insert a pry bar or the like into the universal joint yoke 30 for this purpose.

The greater ease of operation is much appreciated by the operator not only because of the saving of time but because it is frequently undesirable that the driven shaft be rotated prior to assembly, any more than is absolutely necessary.

I claim:

1. A coupling between a power take-off shaft and a driven shaft, such coupling comprising male and female coupling elements having mating splines, the splines of the female coupling element having ends spaced inwardly from the end of the female coupling element and being characterized by lateral surfaces which are mutually convergent toward the ends of the splines which are first presented to the male coupling element in the assembly of such elements, the metal at the said ends of the splines of the female element between the convergent sides thereof being more dense than metal elsewhere in said splines.

2. A coupling between a power take-off shaft and a driven shaft, such coupling comprising male and female coupling elements having mating splines, the splines of the female coupling element extending inwardly away from the end thereof and being characterized by lateral surfaces which are mutually convergent toward the ends of the splines which are first presented to the male coupling element in the assembly of such elements, the metal at the said ends of the splines of the female element between the convergent sides thereof being more dense than metal elsewhere in said splines.

(References on following page)

References Cited by the Examiner

UNITED STATES PATENTS

| | | | |
|---|---|---|---|
| 600,994 | 3/1898 | See | 29—159.2 |
| 2,021,184 | 11/1935 | Hill | 285—399 X |
| 2,393,628 | 1/1946 | Goldie et al. | 29—159.2 |
| 2,675,257 | 4/1954 | Specht | 287—119 |
| 2,741,833 | 4/1956 | Beringer | 72—340 |
| 2,854,867 | 11/1958 | Smith | 72—340 |
| 2,910,842 | 11/1959 | Sensening | 64—4 |
| 2,926,034 | 2/1960 | Weaver | 287—53 |
| 2,998,990 | 9/1961 | Plattsmier et al. | 287—103 |
| 3,048,431 | 8/1962 | Shores | 287—103 |

CARL W. TOMLIN, *Primary Examiner.*

I. B. TALTON, D. W. AROLA, *Assistant Examiners.*